J. W. Ward,
Brick Machine.

Nº 5,610.          Patented May 30, 1848.

UNITED STATES PATENT OFFICE.

JONA. W. WARD, OF CAMBRIDGE, MASSACHUSETTS.

BRICK-PRESS.

Specification of Letters Patent No. 5,610, dated May 30, 1848.

*To all whom it may concern:*

Be it known that I, JONATHAN W. WARD, of Cambridge, in the county of Middlesex and State of Massachusetts, have invented a new and useful Improvement in Machines for Striking or Molding Bricks; and I do hereby declare that the same is fully described and represented in the following specification and accompanying drawings, letters, figures, and references thereof.

Figure 4:
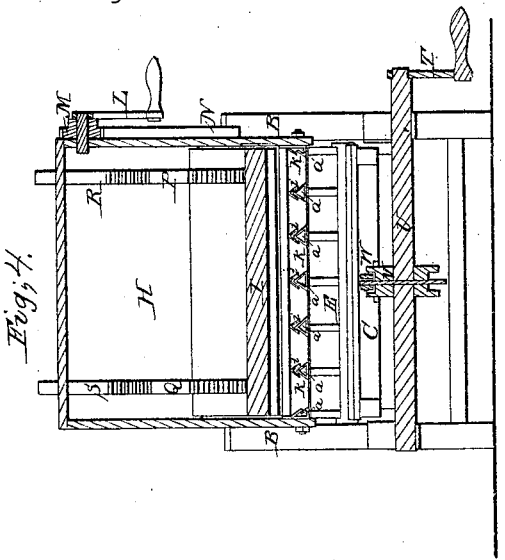
Figure 3:
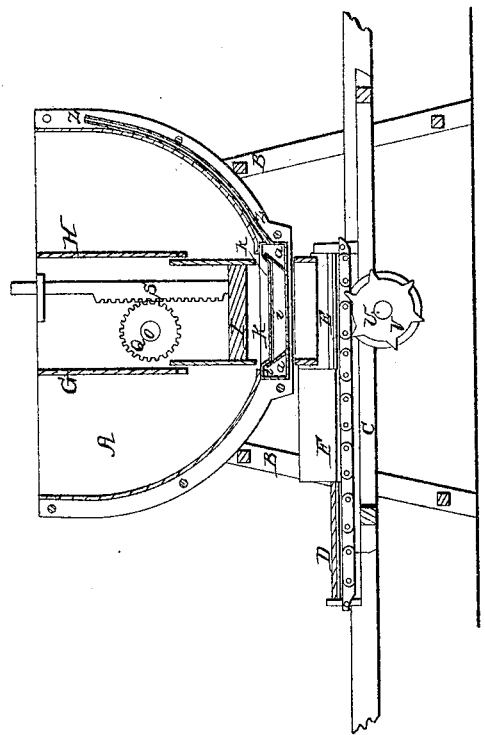
Figure 5:
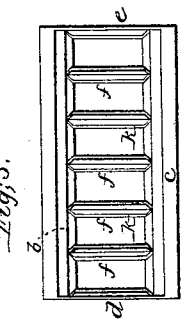
Figure 1:
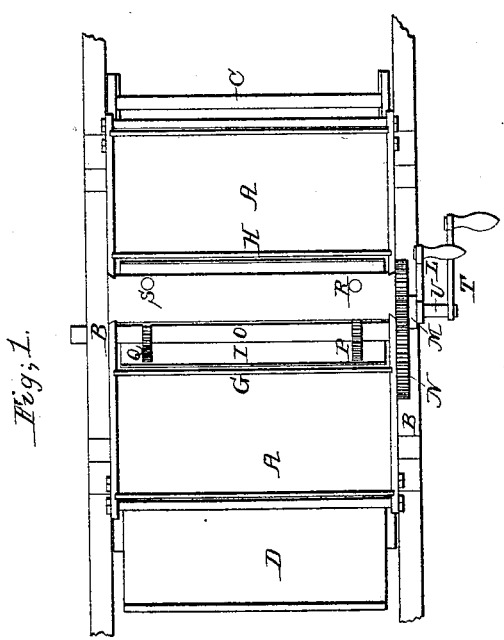
Figure 2:
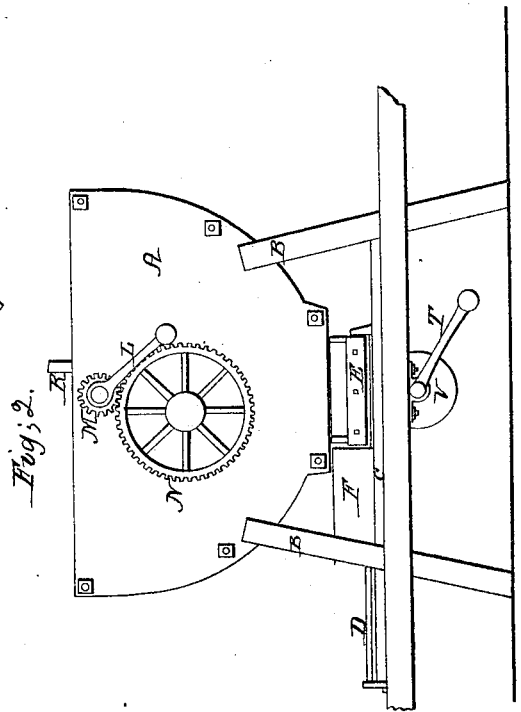

Of said drawings Figure 1, denotes a top view of my machine, Fig. 2, is a side elevation of it, Fig. 3 is a vertical central and longitudinal section of it, Fig. 4 is a vertical, central and transverse section of it, Fig. 5, is a top view of the water frame and openings at the bottom of the hopper.

In said drawings, A, exhibits a hopper or receptacle for containing the mortar or clay to be converted into bricks. It is supported by a frame B, and directly over a carriage C, which is suitably supported by the frame and by proper mechanism is made capable of being alternately moved back and forth in a longitudinal direction underneath the hopper. The said carriage is made to support two sets (D, E,) of molds, which are arranged on each side of an elevation or platform F, raised on the middle part of the carriage, and being of a width to correspond with that of the bottom part of the hopper as seen in the drawings.

There are two parallel and vertical partitions G, H, extending across the hopper and downward from the top thereof, about two thirds of its depth. Between them a piston or forcer I, works. It is intended to press the clay down through the vents K K, &c., each of which communicates with one of the molds of the set D, E, when moved under it. The mechanism by which the piston is moved and depressed consists of a crank L, a cogged pinion M, a cogged wheel N, a shaft O, two cogged pinions P, Q, on said shaft A, and two vertical racks R, S, extending upward from the piston, the whole being arranged together as seen in the drawings. The mold cariage C, is moved back and forth by a crank T, on a shaft U, a toothed pinion V, and a chain rack or toothed rack W, arranged as seen in the drawings.

My improvement consists in surrounding each of the vents at the bottom of the hopper with a small reservoir of water and making said reservoir with an opening sufficiently wide to allow a very thin sheet of water to continually trickle or pass over the sides and end of each vent, the same being for the purpose of preventing the bricks after being molded from adhering too strongly to the sides of the mold as they often do. When such occurs, that is, when there is too great an adhesion of any one or more of said bricks, it is not only difficult to remove it or them from the molds but said brick is very apt to be injured in shape or broken during its removal.

I make the sides and ends of the vents hollow, as seen at $a$, $a$, $a$, &c, in Figs. 3 and 4, or in other words the frame of vents is made hollow on its sides and ends $b$, $c$, $d$, $e$, and has triangular tubes $f$, $f$, $f$, &c., extending from side to side and freely communicating with the internal spaces of the said sides. There is an opening or long slot at or near the top part of each of sides, ends, and transverse tubes of the vent frame, said openings being denoted by $i$, $i$, &c., in Figs. 3, 4. A thin and bent sheet of metal $k$, is placed over each opening, and is made to extend down the sides of each vent, but so as to leave a very thin space between them and the sides of the vent, through which (space) water is to be allowed to pass, during the operation of striking or molding the bricks. The water is poured into the fountain or space around the vents, there being mouths or lips Z, made upon said fountain to receive the water, or instead of the same the fountain surrounding the vents may be connected with another and more elevated fountain sufficient to keep up a large supply of water.

What I claim as my invention is—

The combination with each of the vents of a water tube or fountain so arranged as to cause water to pass over and wet the vent or passage of the clay from the hopper into the mold, substantially as above specified.

In testimony whereof I have hereto set my signature this third day of February, A. D. 1848.

JONATHAN W. WARD.

Witnesses:
 R. H. EDDY,
 F. GOULD.